United States Patent Office 3,451,418
Patented June 24, 1969

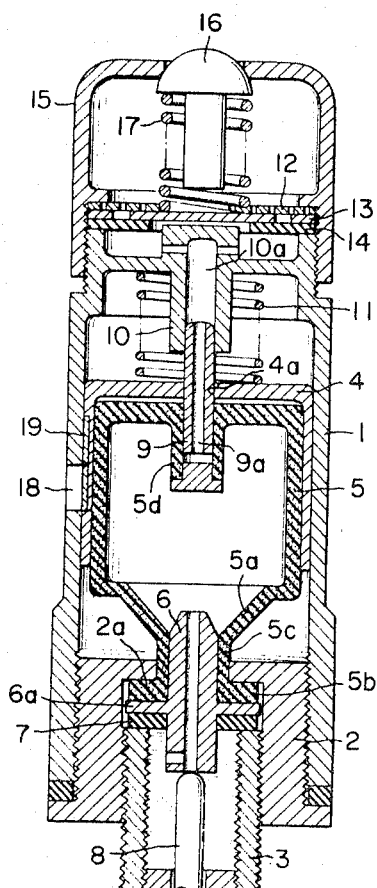
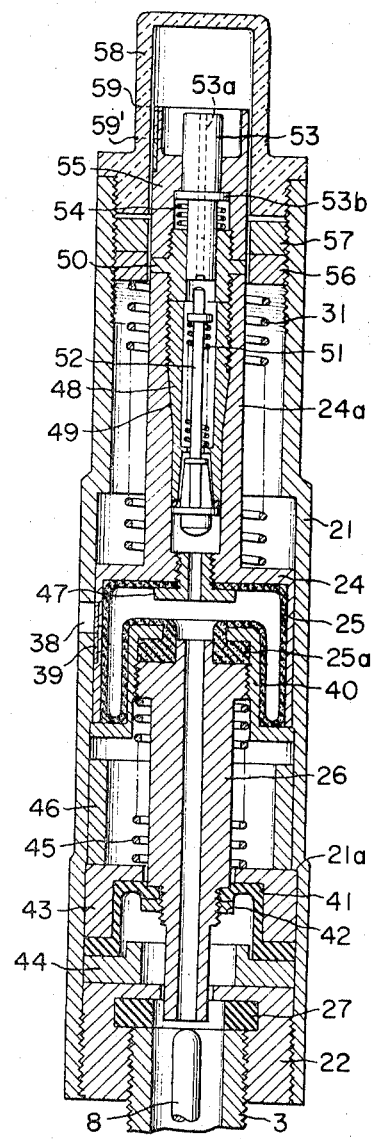
FIG.1
FIG.2

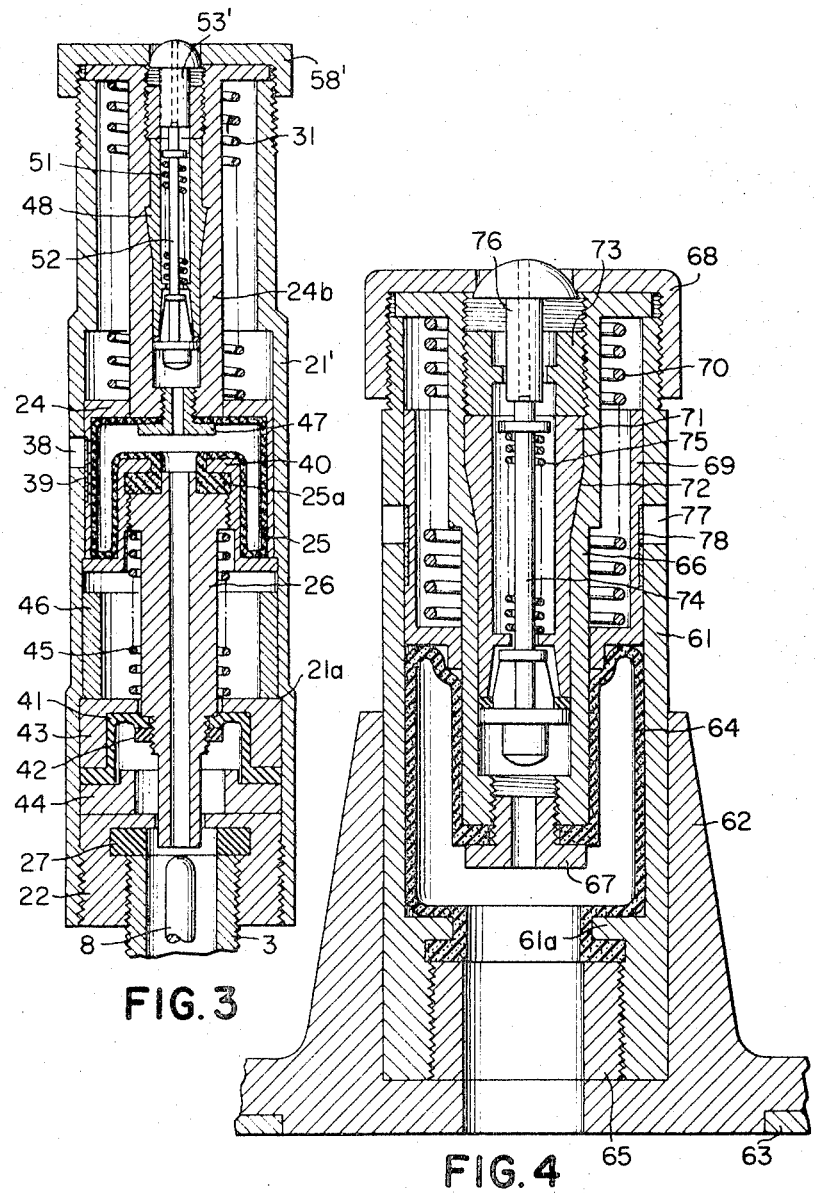

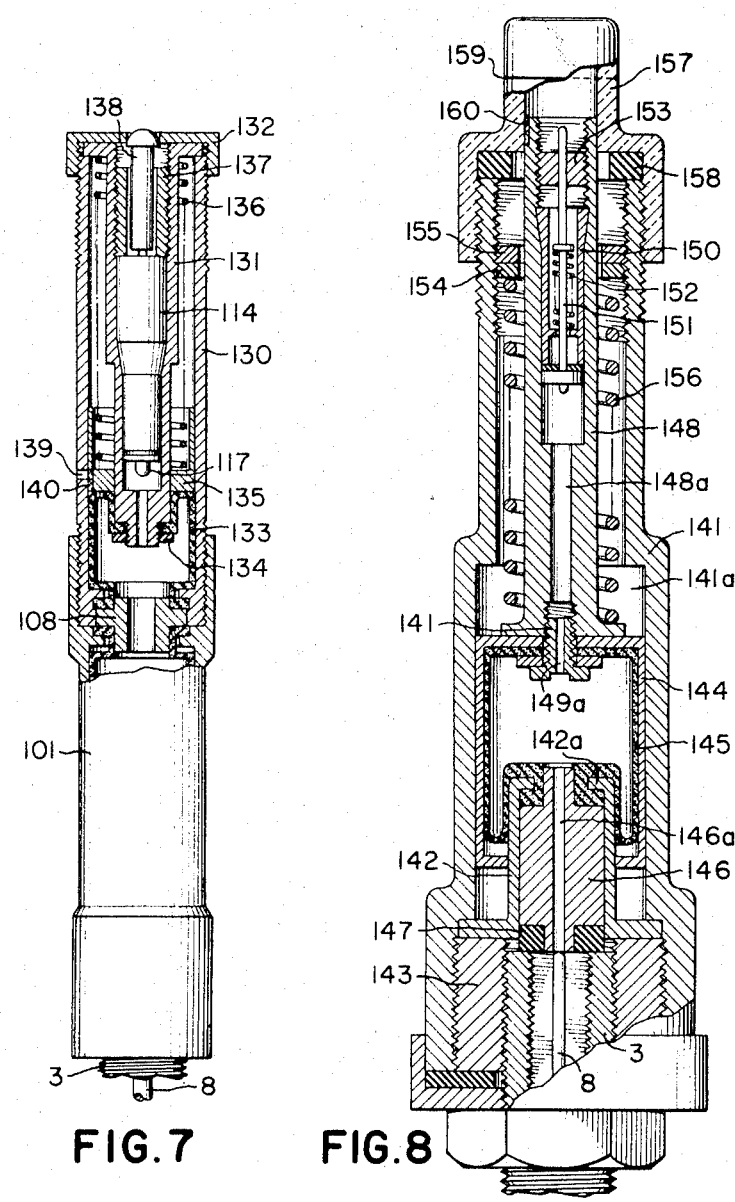

3,451,418
DEVICE FOR INDICATING THE INTERIOR PRESSURE OF A PNEUMATIC TIRE
Shunshi Nakagawa, Tokyo, and Junichiro Koike, Hyogo-ken, Japan, assignors to Shunshi Nakagawa, Tokyo, Japan
Filed July 19, 1967, Ser. No. 654,487
Claims priority, application Japan, July 27, 1966, 41/70,553; Dec. 6, 1966, 41/110,897; Dec. 7, 1966, 41/79,834; May 19, 1967, 42/31,497; May 27, 1967, 42/33,365
Int. Cl. B60c 23/04
U.S. Cl. 137—227    5 Claims

ABSTRACT OF THE DISCLOSURE

A device for indicating the interior pressure of a pneumatic tire which is adapted to be mounted on a pneumatic tire to indicate the interior pressure thereof and which permits a compressed air to be charged in said pneumatic tire therethrough without being removed from the tire.

---

The present invention relates to a device for indicating the interior pressure of a pneumatic tire.

It is important to maintain the interior pressure of pneumatic tires at an optimum value, particularly when the pneumatic tires are used with high speed automobiles or motorcycles. The interior pressure of a pneumatic tire is most commonly measured by applying a pressure gauge to an air valve of the pneumatic tire. Such a method is so troublesome for the drivers that pressure check is frequently neglected. In order to obviate the foregoing inconvenience, a device for indicating the interior pressure of a pneumatic tire, which is adapted to be mounted on the air valve of tire so as to enable the driver to know at a glance whether the interior pressure is at an optimum value or not, has been proposed by Italian Patent No. 670,424. However, this particular device, while it is advantageous in that the interior pressure of a pneumatic tire being at an optimum value can be known readily as compared with the conventional method of using a pressure gauge, has the inconvenience that it must be removed from the tire at each time the tire is charged with a compressed air. Furthermore, with the device described, it is possible for the air interior of the tire to leak through the device when a fault condition occurs at a portion of said device, and yet further the device, which is manually mounted by screwing it on the air valve of a tire, can be stolen since it is readily removable.

An object of the present invention, therefore, is to provide a device for indicating the interior pressure of pneumatic tires which is adapted to be retained on the pneumatic tires and which enables compressed air to be charged into the tires therethrough.

Another object of the present invention is to provide a device for indicating the interior pressure of pneumatic tires of the type described, which is provided with means for preventing air leakage from the tire upon occurrence of a fault condition at a portion of said device.

According to one aspect of the present invention, there is provided a device for indicating the interior pressure of pneumatic tires of the type which comprises means in communication with the interior of the tire and movable in accordance with the interior pressure of the tire, and means to indicate the interior pressure of the tire by the movement of said first means, said device further comprising air valve means for charging compressed air into the tire through said second means. The device for indicating the interior pressure of the tires of this invention may be used by either manually mounting it on the air valve of the tire or permanently fixing it in the tire or tire tube.

According to another aspect of the present invention, there is provided a device for indicating the interior pressure of pneumatic tires adapted to be mounted on the air valve of tires, which is provided with means of automatically closing the air valve when the interior pressure of the tires has dropped below a prescribed value.

FIGURE 1 is a vertical cross section showing an embodiment of the present invention;

FIGURE 2 is a vertical cross section, similar to FIGURE 1, showing another embodiment of the present invention which is arranged such that it opens the air valve of tire only when the interior pressure of said tire has been built up above a prescribed value;

FIGURE 3 is a vertical cross section showing a modification of the device shown in FIGURE 2;

FIGURE 4 is a vertical cross section of still another embodiment of the present invention which is adapted to be permanently fixed in the tire;

Figure 6:
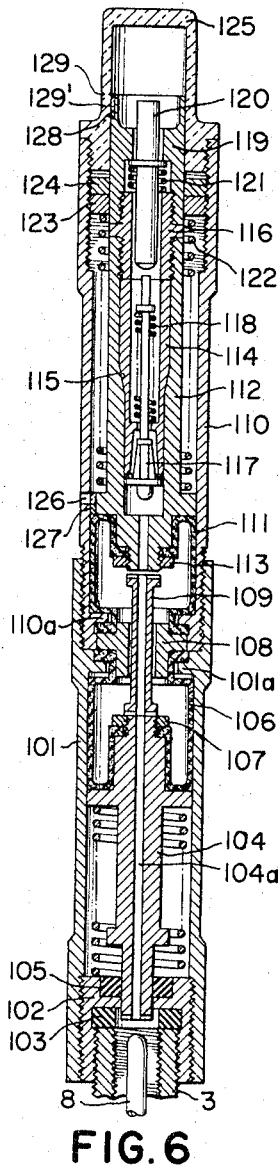

FIGURES 6 and 7 are vertical cross sections of still other embodiments of the present invention respectively which are provided with means for closing the air valve of tire when the interior pressure of the tire has dropped below a prescribed value; and FIGURE 8 is a vertical cross section of still another embodiment of the present invention wherein a device is made to prolong the life of operating parts.

Referring to the drawings and first to FIG. 1, the device for indicating the interior pressure of tires according to the present invention has a substantially cylindrical body 1, with a plug 2 screwed into the lower end thereof. The device is mounted on the air valve 3 of a tire by engaging the internal thread formed in the plug 2 with the external thread on said air valve. Interior of the body 1 is mounted a cup-shaped piston 4 for axial sliding movement therein. The piston 4 has fitted therein a hollow inflatable member 5 made of such a material as rubber. The hollow inflatable member 5 is tapered at one end 5a and the end extremity of said tapered portion 5a is further extended to form a tubular portion 5c which terminates at a flange 5b. In the tubular portion 5c is inserted a nozzle 6 having a flange 6a. The member 5 and the nozzle 6 are secured by having their flanges 5b and 6a clamped between an inwardly extending flange 2a of the plug 2 and the air valve 3 with a packing 7 interposed between said flange 6a and said air valve 3. Due to the arrangement described, one end of the nozzle 6 depresses a push rod 8 in the air valve 3, thereby maintaining said air valve in an open position. The other end of the member 5 is flat and has formed at the center thereof a tubular portion 5d extending inwardly of said member 5. The piston 4 has an aperture 4a bored therein which is in register with the axial hole of the tubular portion 5d. An air injection pipe 9 having a T-shaped passage 9a formed therein is tightly fitted in the tubular portion 5d and the aperture 4a in the piston 4. At the top end of the body 1 is provided an integral boss 10 for slidably receiving the pipe 9 and this boss 10 defines a passage 10a for communication with the passage 9a in pipe 9. A compression spring 11 is mounted between the piston 4 and the top end wall of the body 1 so as to bias said piston 4 constantly downwardly. A cap 15 is screwed on the top end of body 1, with an air filter 12, a disc 13 having a plurality of air inlet apertures therein and an annular deflectable diaphragm valve plate 14 interposed therebetween. The cap 15 has formed at the center of the top end wall thereof an air injection aperture which is normally closed by a valve member 16 arranged for engagement therewith under the biasing force of a spring 17.

In the side wall of the body 1 is formed a window 18 through which part of the piston 4, reciprocatively mounted in said body, is visible, whereas the piston 4 is provided at a corresponding portion of the exterior wall surface thereof with a marking 19 which consists, for example, of several different colors, so that the position of the piston 4 may be identified by the color exposed through the window 18.

In operation, a compressed air charging nozzle not shown is applied to the top surface of cap 15, whereupon the valve 16 is forced open under the pressure of the compressed air against the biasing force of spring 17. The compressed air, therefore, flows into the passage 9a in the pipe 9 through the filter 12, the air inlet apertures in the disc 13, the valve plate 14 being deflected downwardly by said air and the passage 10a in the boss 10. The compressed air further proceeds into the inflatable member 5 upon forcing the tubular portion 5d outwardly and then into the tire through the nozzle 6 and air valve 3 of the tire. Upon removing the compressed air charging nozzle from the cap 15, the valves 16 and 14 are closed and at the same time the tubular portion 5d is again brought into tight contact with the pipe 9, preventing the air interior of the member 5 from leaking therefrom.

In this case, since the interior pressure of the tire is exerted on the interior wall surface of the inflatable member 5, said inflatable member 5 is inflated progressively as the interior pressure of the tire elevating, with the result that the piston 4 is moved upwardly against the biasing force of compression spring 11. Thus, it will be understood that the interior pressure of tire, that is at an optimum value or excessively high or excessively low, can be readily made known from the marking 19 visible through the window 18.

Another embodiment of the present invention shown in FIG. 2 is provided with means to automatically close the air valve of tire and thereby to prevent excessive pressure drop interior of the tire, when the pressure has dropped to a certain level due to leakage caused by a fault condition occurring in the device. Referring to this figure, the device of this embodiment includes a substantially cylindrical hollow body 21 having an internally threaded plug 22 fitted into the lower end thereof, which internal thread is adapted to engage the external thread of the air valve 3 of tire. The body 21 is mounted on the tire by the engagement of the plug 22 with the air valve 3 through a packing 27. Interior of the hollow body 21 is mounted a hollow piston 24 for sliding movement therein which is open at the lower end thereof and has an inflatable member 25, made of a flexible resilient material, e.g. rubber, disposed therein. The inflatable member 25 is provided at its lower end with a flange 25a which is fixedly secured to the top end of an air valve operating member 26 by a holder 40. At the lower portion of the operating member 26 is formed a shoulder, on which an inwardly flexed end of a flexible sealing member 41 is secured by means of a nut 42. An outwardly flexed end of the sealing member 41 is interposed between a cup-shaped member 43 and a ring member 44, and is sealably tightened by the plug 22, the upward movement of said cup-shaped member 43 being limited by a shoulder 21a formed on the interior wall surface of body 21. The operating member 26 is urged upwardly by the biasing force of a compression spring 45 which is mounted between it and the cup-shaped member 43, while the downward movement of said operating member 26 is limited by a collar 46 which is adapted to engage the lower end of holder 40.

The piston 24 has a hollow extension 24a extending upwardly and the interior hollow of said extension 24a is in communication with the interior of inflatable member 25 through the axial passage in a plug 47. In the extension 24a is disposed a valve body 48 which is retained therein by a tapered wall 49 and a valve holder 50. The valve body 48 has a valve member 52 mounted therein which is constantly urged in a closing direction by a spring 51. The holder 50 has an axial hole therein for slidably receiving the lower portion of an entrance nozzle 53 which has a passage 53a formed therein. The nozzle 53 is constantly urged upwardly by a spring 54 and its upward movement is limited by a shoulder on the interior wall of a retaining member 55 which is adapted to engage a central annular flange 53b of said nozzle. The piston 24 and parts rigidly fixed thereto are constantly urged downwardly by a spring 31 mounted between said piston 24 and a spring seat 56 provided at the upper portion of the cylindrical body 21. The spring seat 56 is fixed in the body 21 by means of a lock nut 57. Also mounted in the upper portion of the body 21 is a cap 58 made of a transparent material.

The side wall of the body 21 is formed substantially centrally thereof with a window 38 through which the position of piston 24 is made known, whereas the piston 24 is provided with a marking 39 at the corresponding portion of the exterior side wall surface thereof so as to indicate the position thereof in cooperation with said window. In addition, the transparent cap 58 is provided with indices 59, 59' for indicating the position of piston 24 in cooperation with the top edge of the retaining member 55.

In charging air with the device described above, the transparent cap 58 is removed and a compressed air is charged by pressing the nozzle 53 inwardly with an air charging device not shown. When the nozzle 53 is pressed inwardly, the valve member 52 is caused to move downwardly by the lower end of said nozzle and thus is held in an open position. The compressed air flows through the passage in the valve body 48 and plug 47 into the inflatable member 25 by going past the lower flange-like end of valve member 52 (adequate clearance being provided between the flange-like end and the hollow extension 24a, see FIG. 4 in particular for larger detail). The inflatable member 25, therefore, is inflated causing the operating member 26 to move downwardly against the bias of spring 45. Then, the compressed air passes through the passage in the operating member 26 and flows into the underside of sealing member 41 urging said operating member 26 upwardly. In this case, since the area of the sealing member 41 which is subject to the pressure of compressed air is smaller than that of the inflatable member, the sum of air pressure acting on the sealing member 41 and the force of spring 45, which urge said sealing member 41 upwardly, is smaller than the air pressure in the inflatable member 25 acting downwardly and thus the operating member 26 is moved downwardly. When the operating member 26 is moved downwardly, the bottom end thereof abuts against the push rod 8 of the air valve 3 of tire to force said push rod into the tire, whereby said air valve is opened providing for injection of air into the tire. As the interior pressure of the tire is built up, the piston 24 is moved upwardly against the biasing force of spring 31 and the outstanding pressure in the tire is indicated at both the window 38 and the cap 58. Practically, it is only sufficient to check the pressure level at either the window 38 or the cap 58.

With the construction described, breakage of the extension 24a of piston 24 by an external force or rupture of the inflatable member 25 or sealing member 41, will result in air leakage. According to the present invention, however the arrangement is made such that, when the interior pressure of tire drops to a certain level, the pressure in the inflatable member 25 decreases accordingly, permitting the operating member 26 to move upwardly disengaging from the push rod 8 of air valve 3, so that the air valve is brought into the closed position. Because of such arrangement, it is possible to prevent air leakage beyond said level of pressure, ensuring safe operation of the tire.

When the device of this invention is desired to be mounted on a tire charged with air, the device is first of all mounted on the air valve 3 and then the top end of the retaining member 55 is depressed slightly by a finger tip. The operating member 26, hence, is caused to move downwardly by the piston 24, with its lower end engaging the push rod 8 to open the air valve 3. Thus, the interior pressure in the tire is drawn into the inflatable member 25.

Turning now to FIG. 3, there is shown a modification of the device shown in FIG. 2. In this modification, a portion corresponding to the extension 24a of piston 24 in the preceding embodiment consists of an independent tubular member 24b and the inflatable member 25 is secured to the lower end of said tubular member by a plug 47. The top end of the tubular member 24b is fixed to the top end of body 21' by a cap 58' and the piston 24 is slidably mounted on the exterior wall surface of said member 24'. In addition an entrance valve 53' is provided in lieu of the nozzle 53 in the preceding embodiment. The operation of the device of this embodiment will be readily apparent from the description with reference to the preceding embodiment and therefore will not be explained herein.

FIG. 4 shows still another embodiment of the present invention, which is adapted to be permanently mounted in a tire or tube. In this embodiment, a cylindrical body 61 is fastly mounted in a rubbery mount 62 which in turn is adhesively bonded, for example, to a tire tube 63. Interior of the body 61 is disposed a hollow inflatable member 64 of a flexible material which is fixed in position by having its lower edge clamped between an inwardly extending flange 61a of body 61 and a plug 65. The upper end of the inflatable member 64 is fixedly connected to the lower end of a hollow tubular member 66 by a plug 67, which hollow tubular member 66 in turn is secured at its upper end to the body 61 by a cap 68. A piston 69 is slidably mounted on the exterior wall of said tubular member 66, and this piston is urged downwardly by a spring 70. The inflatable member 64, when inflated by compressed air introduced therein, causes the piston 69 to move upwardly against the biasing force of spring 70.

Interior of the tubular member 66 is a disposed valve body 71 which is fixed in position by a tapered wall 72 and a hollow plug 73. The valve body 71 has a valve member 74 therein which is constantly urged in a closing direction by a spring 75. An entrance valve 76 is arranged for engagement with the central hole of the cap 67 and is constantly urged in a closing direction by the aforementioned valve member 74.

A window 77 is formed in the side wall of body 61 through which the position of piston 69 is made known. On the other hand, the piston 69 is provided at the corresponding portion of the exterior wall surface thereof with a marking 78 for cooperation with said window 77. Upon charging the tire with air, the inflatable member is inflated causing the piston 69 to move upwardly against the biasing force of spring 70, so that, by checking the marking 78 exposed through the window 77, it is possible to know whether the interior pressure of the tire is at a prescribed level or not.

The device of this embodiment may be manually mounted on the air valve of the tire, instead of permanently mounting it in the tire or tube. In this case, it is only necessary to substitute a nozzle 82 for the plug 65 and screwing the body 1 on the air valve 3, with a packing interposed between said plug 65 and said air valve, in the manner shown in FIG. 5. When the body is completely screwed on the air valve, the lower end of nozzle 82 engages the push rod 8 of air valve 3, forcing said push rod downwardly to open the air valve.

Figure 5:
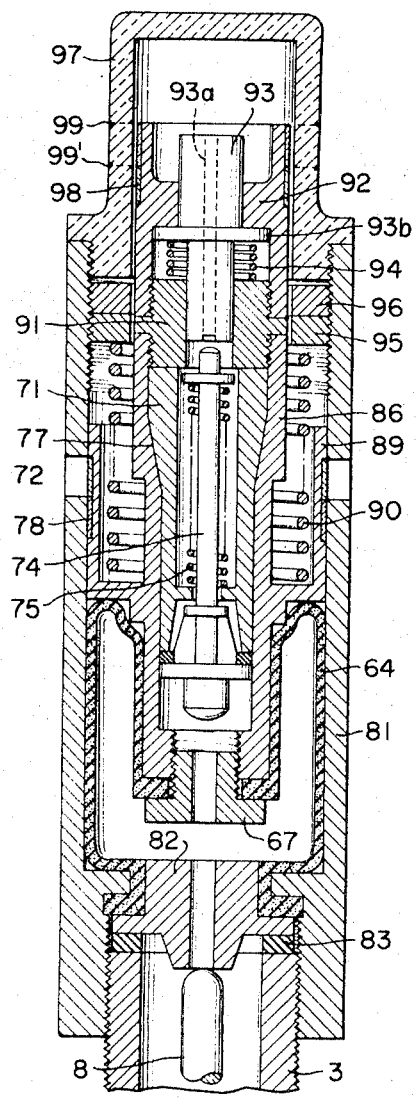
FIGURE 5 is a vertical cross section showing the device of FIGURE 4 as mounted on the air valve of tire.

In the embodiment shown in FIG. 5, a piston 89 is formed integrally with a tubular member 86, and the inflatable member 64 is secured to the lower end of tubular member 86 by means of the plug 67. The tubular member 86 has the valve body 71 fixedly held therein by the tapered wall 72 and a valve holder 91. The valve body 71 has the valve member 74 disposed therein which is urged in a closing direction under the bias of spring 75. The holder 91 has a retaining member 92 screwed on the top end thereof and an entrance nozzle 93 is slidably mounted in said retaining member 92 and holder 91. The nozzle 93 has a passage 93a formed therein and is urged upwardly by a spring 94. The upward movement of the nozzle 93 is limited by a shoulder formed on the interior wall of retaining member 92, which shoulder is adapted to engage an integral annular flange 93b of said nozzle 93.

The piston 89 is urged downwardly by a spring 90 which has the upper end bearing against the underside of a spring seat 95 fixedly mounted in the upper portion of body 81 and the lower end against the bottom wall of piston 89, said spring seat 95 being secured in position by a lock nut 96. A transparent cap 97 is mounted on the top end of body 81, which is provided with index lines 99, 99' for indicating the position of piston in cooperation with a marking 98 provided on the side wall surface of retaining member 92. In addition, the window 77 is formed in the side wall of body 81, whereas the marking 78 is provided at the corresponding portion of the side wall surface of piston 89. The function of this device will become apparent from the description with reference to the preceding embodiment.

The device shown in FIG. 6 is of the type which is adapted to be manually mounted on the air valve of tire and which includes safety means for automatically closing the air valve of tire to stop further air leakage when the interior pressure of the tire has dropped below a prescribed level due to air leakage caused by fault condition of the device, and means for indicating the level of the interior pressure of tire.

The safety means includes a lower cylindrical body 101 with a plug 102 screwed into the lower end thereof, which plug is adapted to be screwed on the air valve 3 of tire through the intermediary of a packing 103. Axially movably mounted in the lower body 101 is an air valve actuating member 104 having an axial passage 104a formed therein and the lower end of said air valve actuating member 104 is extending downwardly through the central hole of the plug 102. The interspace between the plug 102 and the air valve actuating member 104 is sealed air-tight by a packing 105. An inflatable member 106 made of a flexible resilient material has its lower end air-tightly connected to the upper end of actuating member 104 by a nut 107 and has its upper end fixedly secured to an inwardly extending annular shoulder 101a provided in the upper portion of body 101 in such a manner as will be described later.

On the other hand, the tire pressure indicating means includes an upper cylindrical body 110 which is mounted on the top end of lower cylindrical body 101 by screwing it thereon. An inflatable member 111 of a flexible resilient material is mounted interior of the upper body 110, which has the lower end fixedly secured by being clamped between an inwardly extending annular flange 110a provided in the lower portion of body 110 and an outwardly extending flange of a tubular sleeve 108. The top end of the inflatable member 106 in the lower body 101 is secured by being clamped between the inwardly extending annular flange 101a of body 101 and the outwardly extending flange of sleeve 108. Extending slidably through the axial hollow of the sleeve 108 is an operating tube 109 which is longer than said sleeve.

Also axially reciprocatively mounted in the lower body 110 is a hollow tubular piston member 112 which has the top end of the inflatable member 111 secured to the lower end thereof by means of a nut 113. The piston member 112 has mounted in the axial hollow thereof a valve body 114 which is secured in position by a tapered wall 115 and valve holder 116, and in which is disposed a valve member 117 being urged in a closing direction by a spring 118. A retaining member 119 is provided in the upper portion of the valve holder 116 in screw engagement therewith and an operating rod 120 is arranged in said holder 116 and retaining member 119 for axial movement therein with a suitable gap therebetween. The operating rod 120 is urged upwardly by a spring 121 and its upward movement is limited by the engagement of an annular flange thereof with a shoulder on the retaining member 119. The piston member 112 is constantly urged downwardly by a spring 122 which has the upper end bearing against a spring seat 123 fixed in the upper portion of body 110 and the lower end against said piston member 112, said spring seat 123 being fixedly secured by the lock nut 124. The top end of body 110 is covered by a transparent cap 125.

The side wall of body 110 is formed with a window 126 for visually checking the position of piston 112 therethrough, whereas at the corresponding portion of the side wall surface of piston 112 is provided a marking 127 representing the position of said piston. Further, a marking 128 is provided on the side surface of retaining member 119 which, in cooperation with indices 129, 129' provided on the cap 125, indicates the position of the piston.

In this embodiment, when a compressed air is injected into the device, the lower inflatable member 106 is inflated causing the actuating member 104 to move downwardly. The lower end of said actuating member, therefore, abuts against the push rod 8 of air valve 3, thus opening said air valve. When a fault condition occurs at any position of the device with a resultant air leakage, the inflatable member 106 contracts as the interior pressure of tire drops and, as a result, the actuating member 104 is permitted to move upwardly, placing the air valve 3 into the closed position. Hence, a further air leakage can be avoided. The operation of the other portions of this device is the same as or equivalent to that described in any one of the preceding embodiments and the explanation thereof will be omitted.

FIG. 7 shows a modification of the device shown in FIG. 6, in which the pressure indicating means is modified slightly, although the safety means remains exactly the same.

Describing more specifically, with reference to FIG. 7, an upper cyindrical body 130 has an elongate hollow member 131 mounted therein, which is fixed by a cap 132 at the top end of said body, and to the lower end of said hollow member 131 is fixed the upper end of an inflatable member 133 by means of a nut 134. A piston 135 is slidably mounted on the lower portion of the exterior wall of hollow member 131 and is constantly urged downwardly by a spring 136. Thus, it will be seen that, upon inflation of the inflatable member 133, the piston 135 is moved upwardly against the biasing force of spring 136. Disposed in the hollow member 131 is a valve which, alike that in the preceding embodiment, consists of a valve body 114 and a valve member 117, and is fixed by a screw member 137. An entrance valve 138 is received in the axial hollow of the screw member 137 for cooperation with the central hole in the cap 132. Numeral 139 indicates a window formed in the body 130 and 140 indicates a marking provided on the piston 135 for cooperation with said window.

Still another embodiment of the present invention is shown in FIG. 8. The device of this embodiment includes a body 141 and a cup-shaped holder 142 disposed in the lower end portion of body 141 which is secured by a plug 143. A hollow piston 144 is mounted in a cylindrical chamber 141a formed in the lower portion of body 141 for reciprocative movement therein and an inflatable member 145 of a flexible material is disposed interior thereof. The lower end of the inflatable member 145 is secured by being clamped between an inwardly extending lip 142a of holder 142 and a plug 146 disposed in said holder, said plug 146 having an axial passage 146a formed therein. When the plug 143 is screwed on the air valve 3 of tire, the plug 146 is moved upwardly towards the lip 142a of holder 142 by the top end of said air valve. A sealing member 147 is interposed between the plug 146 and air valve 3. The lower end of plug 146 abuts against the push rod 8 of air valve 3 pushing it downwardly and thereby the air valve 3 is opened.

In the upper portion of the piston 144 is arranged an elongate rod member 148 having an axial passage 148a formed therein and connected to the piston as well as to the inflatable member by means of a plug 149 having an axial passage 149a formed therein, so that the passage 148a is in communication with the interior of the inflatable member. The passage 148a in the elongate rod member 148 is enlarged in its upper portion, with a valve body 150 received therein. The valve body 150 has mounted therein a valve member 151 which is urged in a closing direction by a spring 152. The upper portion of the valve member 151 is guided by a guide 153 secured to the top end of the elongate rod member 148. A spring seat 154 is provided near the top end of body 141 and held in position by a lock nut 155. The piston 144 is urged downwardly by a spring 156, the other end of which is bearing against the spring seat 154. The top end of body 141 is covered by a transparent cap 157 which is mounted thereon through a gasket 158. The cap 157 is provided at a suitable position on the surface thereof with an index 159, whereas a marking 160 is provided at the corresponding portion of the upper portion of elongate rod member 148, so as to provide means for indicating the interior pressure of tire in cooperation with each other.

The device in this embodiment is common with the preceding embodiments in that a compressed air is charged by forcing the valve member 151 downwardly, but is different from the latter in that, since the inflatable member 145 is protected by being completely enclosed by the piston 144, said inflatable member has a prolonged lift.

Although the present invention has been described and illustrated herein in terms of the specific embodiments thereof, it is to be understood that many changes and modifications are possible without deviating from the concept and scope of the invention.

We claim:

1. A device for indicating the interior pressure of a pneumatic tire, comprising a hollow body, inflatable means disposed in said hollow body, means maintaining the air valve of said pneumatic tire in a normally open position, the interior pressure of said pneumatic tire being in communication with he interior of said inflatable means, means automatically indicating the interior pressure of said pneumatic tire at any given moment of time, said device being secured to the air vave of said pneumatic tire and being capable of having compressed air charged directly therethrough for inflating said pneumatic tire, and means for automatically closing said air valve of said pneumatic tire when the interior pressure thereof has dropped below a predetermined value.

2. The device according to claim 1, wherein a hollow piston comprises part of an air injection pipe which permits the air to be charged therethrough into said inflatable means.

3. The device according to claim 2, wherein said piston encloses said inflatable means.

4. The device according to claim 3, wherein said means automatically indicating the interior pressure of said pneumatic tire comprises a window in said hollow body and markings on the lower end of said piston.

5. The device according to claim 4, wherein said means automatically indicating the interior pressure of said pneumatic tire comprises a transparent cap about the free end of said hollow body and markings on the upper end of said piston.

References Cited

UNITED STATES PATENTS

| 1,422,256 | 7/1922 | Conrad | 73—146.8 |
| 1,499,327 | 7/1924 | Badowski | 73—409 |

LOUIS R. PRINCE, *Primary Examiner.*

D. E. CORR, *Assistant Examiner.*

U.S. Cl. X.R.

73—146.8